UNITED STATES PATENT OFFICE.

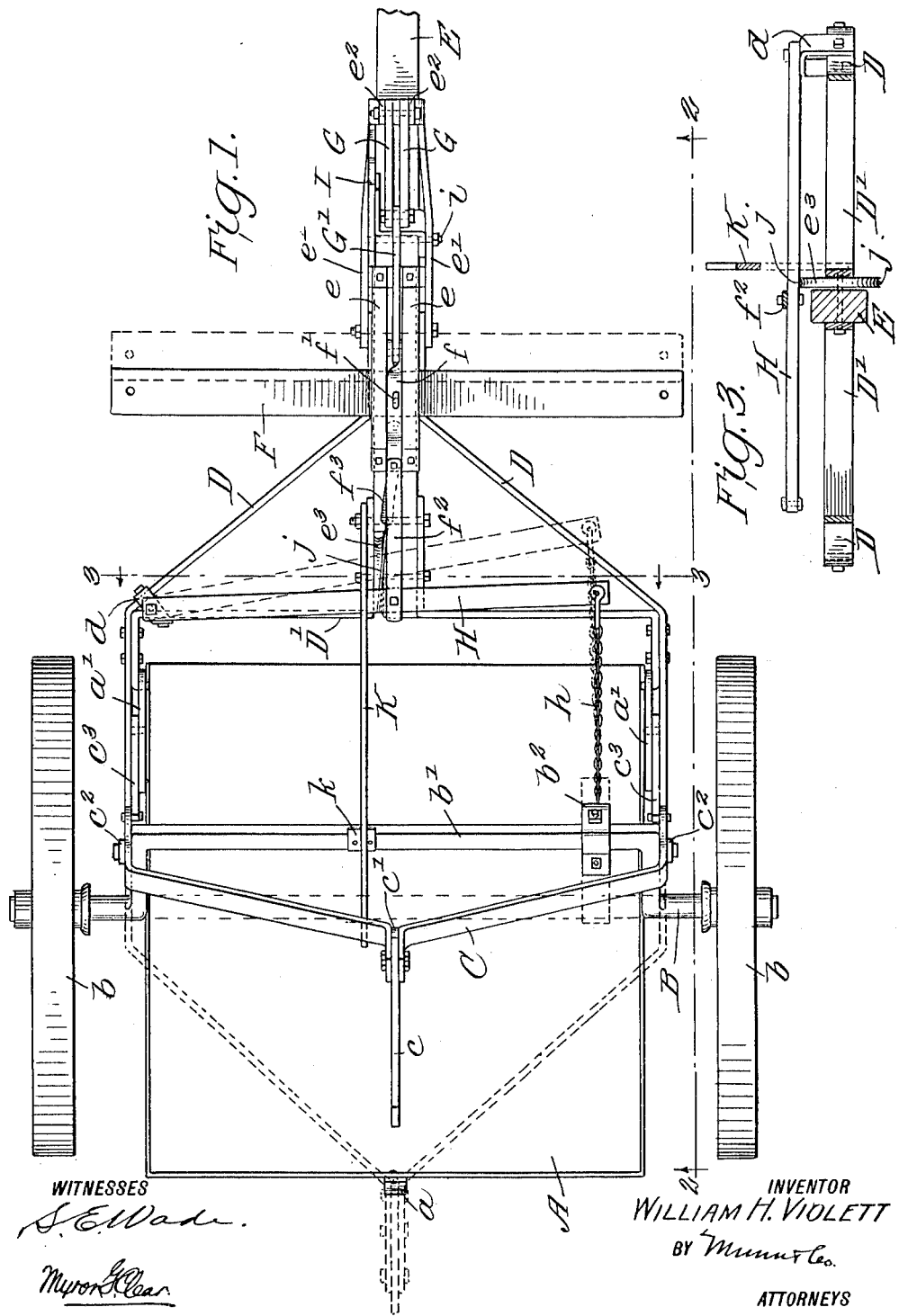

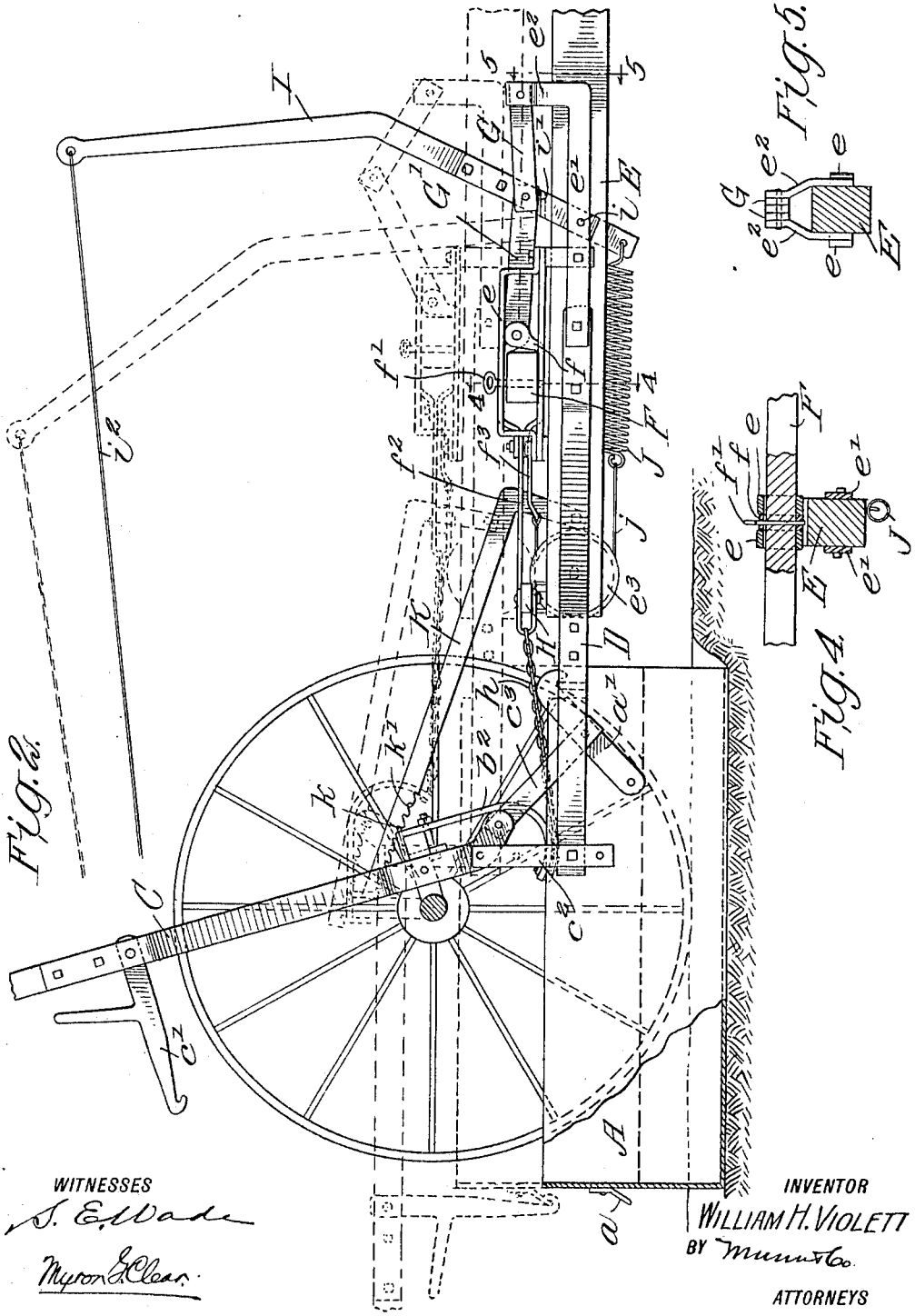

WILLIAM HORACE VIOLETT, OF RIFLE, COLORADO.

WHEELED SCRAPER.

1,106,170.   Specification of Letters Patent.   Patented Aug. 4, 1914.

Application filed April 16, 1913. Serial No. 761,475.

*To all whom it may concern:*

Be it known that I, WILLIAM H. VIOLETT, a citizen of the United States, and a resident of Rifle, in the county of Garfield and State of Colorado, have invented certain new and useful Improvements in Wheeled Scrapers, of which the following is a specification.

My invention relates to wheeled dumping scrapers of the class in which the scoop is connected with a crank axle and the latter operated by a lever for the purpose of vertically adjusting the scoop, and the object of my present invention is to provide draft connections whereby the scoop may be raised after being filled without necessitating manual use of the lever before mentioned.

With this in mind, my invention resides in the features of construction, arrangement and operation to be hereinafter described with respect to the accompanying drawings forming a part of this specification, and in which—

Figure 1 is a plan view of a wheeled dumping scraper embodying my improvements. Fig. 2 is a sectional side elevation thereof taken substantially on the line 2—2 of Fig. 1. Fig. 3 is a transverse vertical section therethrough taken substantially on the line 3—3 of Fig. 1. Fig. 4 is a similar view taken on line 4—4 of Fig. 2. Fig. 5 is another similar view taken substantially on line 5—5 of Fig. 2.

Referring now to these drawings, the scoop or bowl A is provided at its rear with a projecting catch $a$ and is located beneath the axle B supported at its ends by the side wheels $b$ and provided with a crank portion $b'$ between the wheels. The V-shaped lever C is rigidly bolted intermediate the ends of its extensions to the sides of the shank crank portion $b'$, its rear upper handle portion $c$ being provided with a depending and pivoted latch $c'$ adapted for engagement with the scoop catch $a$ when the scoop is raised, and the forward portions of its extremities being connected with the scoop A by means of links $c^2$ and also connected by means of links $c^3$ with pivoted latches $a'$ mounted on the scoop A and adapted for engagement with portions of the bars D, the rear ends of which are rigidly connected to the sides of the scoop A and the forward ends of which are similarly connected to the sides of the draft pole E. Thus the lever C may be raised to the position shown in Fig. 2 in order to lower the scoop A and position the same for filling, the latch $a'$ engaging portions of the draft bars as shown, to prevent further lowering of the forward end or mouth of the scoop A. Likewise the lever C may be pulled down to the dotted line position in Fig. 2 in order to raise the scoop to the upper position shown in dotted lines in this figure in order that it may be transported to the place where it is desired to be dumped, the latch $c'$ engaging the scoop catch $a$ in order to prevent accidental lowering of the scoop. It will be seen, however, that with the scoop A filled, it requires considerable effort, and as a rule, two persons to effect a lowering of the lever C and consequent raising of the scoop, and it is for obviating this difficulty that I propose to provide means whereby the operation may be effected through certain novel draft connections to be now described.

In accordance with my invention, I provide the draft pole E with a longitudinal frame $e$ upon its upper surface and adjacent its rear end and in which frame the transverse draft beam F is freely movable, this frame $e$ being provided with central longitudinal slots in which a yoke or clevis $f$ is mounted to slide, this clevis being secured to the draft beam F by means of a pin $f'$ and being thus adapted to form a guide for the beam in its movements. I also provide the draft pole E with side straps $e'$ rigidly secured thereto and forming substantial continuations of the bars D, and provided at their forward ends with upright portions $e^2$ to which the forward end of a lever G is pivotally connected, the rear end of this lever being pivotally connected to the forward end of a similar lever G', the rear end of which is similarly connected to the forward end of the clevis $f$. The rear end of the clevis $f$ is connected by a member $f^2$ to a transverse lever H, one end of which is pivotally mounted upon a strap $d$ connecting one of the draft bars D and its cross bar D', and the opposite end of which lever D is connected by means of a chain or other flexible connection $h$ to the curved extremity of the bracket arm $b^2$ securely bolted to the crank portion $b'$ of the wheel axle B. Thus with the draft animals exerting pull upon the transverse draft beam F to which they are connected, and with the levers G and G' in the position shown in Fig. 2, the power will be transmitted from the beam F through the clevis $f$ and levers G and G' to the draft pole E and then through the draft bars D directly to the lowered scoop.

An upright trip lever I is pivotally connected at $i$ to the draft pole E and is provided with a shoulder $i'$ disposed beneath the pivotally connected ends of the levers G and G', so that when the upper end of the trip lever I is pulled rearwardly, for instance by means of a flexible connection $i^2$, the shoulder $i$ will bear upwardly against the levers G and G' and cause the same to flex to the position shown in dotted lines in Fig. 2, thus destroying the power connection between the beam F and the pole E and permitting the beam to move forwardly in the pole frame $e$ and transmit its power directly through the connecting member $F^2$, lever H and connections $h$ to the bracket arm $b^2$. The effect of this operation is very apparently to rock the wheel axle B and the lever C and cause the scoop A to be raised to the position shown in dotted lines in Fig. 2. The rear end of the clevis $f$ is also provided with an arm $f^3$ extending rearwardly therefrom and connecting to a flexible member $j$ passing forwardly around a pulley $e^3$ journaled in the rear end of the draft pole E, the lower end of the member $j$ being connected to one end of a coil spring J, the opposite forward end of which is connected to the lower end of the trip lever I. Thus when the lever I is moved rearwardly to trip the parts as before described, the effect is to stretch the spring J and when the spring is further stretched by means of the subsequent forward movement of the draft beam F, the effect is to return the trip lever to its normal position so that when after the scoop has been raised and the machine proceeds to the place where the scoop is to be dumped, the levers G and G' are free to drop to their normal positions as soon as there is sufficient slack in the draft parts. The crank portion of the wheel shaft B is also provided with a catch plate $k$ with which the rear end of a lever J is normally connected by means of its rack face $k'$, the forward end of said lever K being pivotally connected to the draft pole which of course moves downwardly with the scoop A when the latter is lowered. Thus the lever K will not interfere with the normal operations of these parts but will operate to prevent the scoop from dumping unless the lever is raised.

I claim:

1. The combination with a wheeled scraper embodying a vertically adjustable scoop, of a draft pole directly connected to said scoop, a draft beam pivoted levers normally alined and forming a connection between said beam and said pole and having flexible connections with the scoop whereby to raise the same after filling, and means whereby to move the said levers to render the said connections between the beam and the pole operative and inoperative as desired.

2. The combination of a wheeled shaft having a crank portion, an extension carried by the crank portion, a lever rigidly secured to said crank portion, a vertically adjustable scoop, a pivotal connection between the lever and scoop, a draft pole having connection with the scoop, a transverse draft beam having connection with the extension of the crank portion, connections between the draft beam and draft pole and movable to operative and inoperative positions, a lever pivoted on the draft pole and movable to trip the said connections from an operative to an inoperative position, and means tending to maintain said trip lever in a normal inoperative position and to return the same after an operation.

3. The combination of a wheeled shaft having a crank portion, an extension carried by the crank portion, a lever rigidly secured to said crank portion, a vertically adjustable scoop, a link pivotally connecting the lever with the scoop, a draft pole, rigid connections between the scoop and the said draft pole and including an upright portion, a transverse draft beam freely movable with respect to the draft pole, flexible connections extending rearwardly from the said draft beam and secured to the said extension of the shaft crank, a pair of pivotally connected levers extending between said draft beam and said upright portion of said pole connections, and a trip lever pivoted on the pole and having means whereby to cause flexing of said pivotally connected levers for the purpose described.

4. The combination of a wheeled shaft having a crank portion, an extension carried by the crank portion, a lever rigidly secured to said crank portion, a vertically adjustable scoop, a link pivotally connecting the lever with the scoop, a draft pole, rigid connections between the scoop and said draft pole and including an upright portion, a transverse draft beam freely movable with respect to the draft pole, connections extending rearwardly from the said beam and having connection with the said extension of the shaft crank, a pair of pivotally connected levers extending between the said draft beam and said upright portion of said pole connections, a trip lever pivoted on the pole and having means whereby to cause a flexing of said pivotally connected levers, and flexible connections between said draft beam and said trip lever and tending to return the latter to its normal position after an operation thereof.

WILLIAM HORACE VIOLETT.

Witnesses:
O. O. FELLOWS,
JOHN F. BILLIG.

Copies of this patent may be obtained for five cents each, by addressing the "Commissioner of Patents, Washington, D. C."